United States Patent Office 3,753,945
Patented Aug. 21, 1973

3,753,945
STABILIZED COMPOSITIONS
Eduard K. Kleiner, Dobbs Ferry, N.Y., assignor to
Ciba-Geigy Corporation
No Drawing. Original application Jan. 31, 1969, Ser. No. 795,696, now Patent No. 3,639,538, dated Feb. 1, 1972. Divided and this application Mar. 12, 1971, Ser. No. 123,819
Int. Cl. C08f 45/58; C08g 51/58
U.S. Cl. 260—45.85 H                    8 Claims

ABSTRACT OF THE DISCLOSURE

Organic materials, particularly synthetic polymers such as polypropylene, are protected against oxidation in air, thermal degradation or deterioration by including, in such substances, a stabilizing amount of an antioxidant. The antioxidant is obtained by reacting (a) an $\alpha,\beta$-unsaturated ester of a hindered hyroquinone and (b) a phosphinodithioic acid or a O,O-diester of phosphorothiolothionic acid.

---

This application is a divisional of copending application Ser. No. 795,696, filed Jan. 31, 1969, now U.S. Pat. 3,639,538.

DETAILED DISCLOSURE

The present invention is concerned with novel compounds which are useful as antioxidants for organic materials and particularly, as antioxidants for synthetic polymers such as, for example, polypropylene, polyethylene, polyesters, polystyrene, polyvinylchloride, nylon and other polyamides, cellulosics, polyacetals, polyurethanes, petroleum and wood resins, mineral oils, animal and vegetable fats, waxes, rubbers such as styrene-butadiene rubber (SBR), acrylonitrile-butadiene-styrene rubber (ABS), olefin-copolymers, ethylene-vinyl-acetate copolymers, polycarbonates, polyacrylonitrile, poly(4-methyl pentene-1) polymers, polyoxymethylenes, and the like. The present invention also relates to a novel procedure for preparing the aforesaid novel antioxidants and to stabilized compositions containing said novel antioxidants.

The prevention of oxidation of various organic materials is obviously of primary industrial concern and therefore, antioxidants are used in or added to a wide variety of commercial products such as synthetic polymers of the type indicated supra, oils, plastic materials, etc., which are normally subject to oxidative deterioration.

The novel antioxidants of the present invention are represented by the following formula:

(Formula I)

wherein

—Q is —R$^4$ or —OR$^4$

—R is

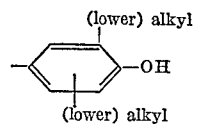

—R$^1$, —R$^2$, —R$^3$ are each hydrogen, lower alkyl, phenyl, aralkyl or —C$_m$H$_{2m}$COOR, where $m$ is 0 to 6

—R$^4$ is alkyl, cycloalkyl, phenyl, aralkyl and when Q is —OR$^4$ the two —R$^4$ groups can be —(CH$_2$)$_n$—, where $n$ is 2 or 3, forming a cyclic O,O-diester of phosphorothiolothionic acid.

As used herein, alkyl covers groups having from 1 to 24 carbon atoms, and preferably from 1 to 12 carbon atoms. Illustrative examples of such groups are methyl, ethyl, isopropyl, n-butyl, t-butyl, n-hexyl, n-octyl, n-decyl, n-dodecyl, n-hexadecyl, eicosyl, tetraeicosyl and the various branched chain isomers thereof. By "lower alkyl" is meant alkyl groups having from 1 to 6 carbon atoms. Cycloalkyl includes cycloalkyl groups having up to 6 carbon atoms, such as cyclobutyl, cyclopentyl, cyclohexyl. Aralkyl covers phenyl substituted alkyl groups having up to 24 carbon atoms. In addition to alkyl substitution the phenyl groups may also be substituted chlorine, bromine, alkoxy, hydroxyl, alkylthio or a carboalkoxy group. Illustrative examples of aralkyl groups are benzyl, phenylethyl, 2,4-dibutylphenyl, 2,4,6-trihexylphenyl, 2-chlorotolyl, 4-hydroxy - 3 - methylphenyl, 4-ethoxyphenyl, 4-butylhtiophenyl, 4-ethoxyphenyl, 4-butylthiophenyl, 3-hydroxy-4-ethylthiophenyl and the like. Where R$^1$, R$^2$ or R$^3$ is —C$_m$H$_{2n}$, $m$ is 0 to 6, but preferably 0 or 1.

The novel antioxidants of the present invention are the addition products of (a) an $\alpha,\beta$-unsaturaetd ester of hindered hydroquinone of the formula

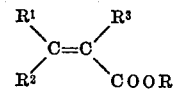

and (b) a phosphinodithioic acid or a O,O-diester of a phosphorothiolothionic acid of the formulae

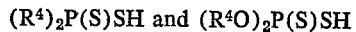

respectively, wherein —R, —R$^1$, —R$^2$, —R$^3$, —R$^4$ are as defined above. The addition reaction involving the $\alpha,\beta$-unsaturated ester and a phosphinodithioic acid or a O,O-diester of a phosphorothiolothionic acid is effected by heating equivalent amounts of the reactions in an inert solvent at temperatures from about 30 to about 100° C. as described in Houben-Weyl, Methoden der Organischen Chemie, vol. XII/1 (1963) page 284 and vol. XII/2 (1964), page 683 (Georg Thieme Verlag, Stuttgart). A catalytic amount of base may be used to speed up the condensation reaction, especially if lower condensation temperatures are employed. Preferred bases are alkoxides such as sodium or potassium methoxide or ethoxide, organic bases such as piperidine, triethylamine, picoline or benzyltrimethylammonium hydroxide and the like.

The novel antioxidants of this invention were prepared by using the following general procedure:

Equimolar amounts of the $\alpha,\beta$-unsaturated ester and the phosphinodithioic acid or O,O-diester of a phosphorothiolothionic acid are dissolved in 2 to 3 times the amount of chloroform or benzene and sealed under nitrogen. The reaction vessel is kept at about 80° C. for 12 to 20 hours until the conversion is complete as checked by thin layer chromatography. The reaction mixture is then washed with a saturated sodium bicarbonate solution and water, and then dried over sodium sulfate. Then the solvent is evaporated and the crude product purified either by distillation or by crystallization or by filtering the solution through neutral aluminum oxide. Yields are high, that is, generally over 80%.

Illustrative α,β-unsaturated esters used in preparing the antioxidants of the present invention as indicated above, are represented by the following formula:

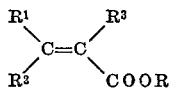

wherein
—R is

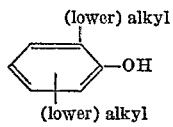

and $R^1$, $R^2$ and $R^3$ are as defined above.
Examples of such esters are:

| Esters of— | $R_1$ | $R_2$ | $R_3$ |
|---|---|---|---|
| Acrylic acid | —H | —H | —H |
| Methacrylic acid | —H | —H | —CH₃ |
| Crotonic acid | —CH₃ | —H | —H |
| Cinnamic acid | —C₆H₅ | —H | —H |
| Fumaric acid | —COOR | —H | —H |
| Maleic acid | —H | —COOR | —H |
| Mesaconic acid | —COOR | —H | —CH₃ |
| Citraconic acid | —H | —COOR | —CH₃ |
| Itaconic acid | —H | —H | —CH₂COOR |
| Aconitic acid | —COOR | —H | —CH₂COOR |

The preferred α,β-unsaturated esters are esters of acrylic acid, fumaric and itaconic acid. The preferred phosphinodithioic acid used in preparing antioxidants represented by Formula I where —Q is —$R^4$ are dialkylphosphinodithioic acids such as diphenyl- and dibenzylphosphinodithioic acids.

Illustrative examples of phosphinodithioic acids are dimethylphosphinodithioic acid,
diethylphosphinodithioic acid,
diisopropylphosphinodithioic acid,
di-n-butylphosphinodithioic acid,
di-n-octylphosphinodithioic acid,
di-n-dodecylphosphinodithioic acid,
di-n-octadecylphosphinodithioic acid,
diphenylphosphinodithioic acid,
dibenzylphosphinodithioic acid,
bis(4-methylphenyl)phosphinodithioic acid,
bis(4-chlorophenyl)phosphinodithioic acid,
bis(3,5-di-t-butylphenyl)phosphinodithioic acid,
bis(3,5-di-n-hexylphenyl)phosphinodithioic acid and the like. These phosphinodithioic acids are well known and are described in Houbenheyl, ibid., vol. XII/1 (1963), pages 269–272.

The preferred O,O-diesters of phosphorothiolothionic acid used in preparing antioxidants represented by Formula I where —Q is —$OR^4$ are the dialkylesters with straight or branched chain alkyl groups having from 1 to 18 carbon atoms, diphenyl and diaralkylesters.

Illustrative examples of O,O-diesters of phosphorothiolothionic acids are O,O-dimethyl hydrogen phosphorodithioate; O,O-diisopropyl hydrogen phosphorodithioate; O,O-di-n-pentyl hydrogen phosphorodithioate; O,O-di-n-octyl hydrogen phosphorodithioate; O,O-di-n-dodecyl hydrogen phosphorodithioate; O,O-di-n-octadecyl hydrogen phosphorodithioate; O,O-diphenyl hydrogen phosphorodithioate; O,O-dibenzyl hydrogen phosphorodithioate; O,O-bis(2-phenylethyl) hydrogen phosphorodithioate; O,O-bis(4-methylphenyl) hydrogen phosphorodithioate; O,O-bis(3,4-di-t-butylphenyl) hydrogen phosphorodithioate, cyclic O,O-diesters of phosphorothiolothionic acids such as 2 - mercapto-2-thiono-1,3,2-dioxaphospholane, 2 - mercapto - 2 - thiono - 4,5 - dimethyl - 1,3,2-dioxaphospholane and the like. These O,O-diesters of phosphorothiolothionic acids are well known and are described in Houben-Weyl, ibid., vol. XII/2 (1964), pages 683–689.

Some of the preferred starting α,β-unsaturated ester compounds used in preparing the antioxidant compounds of the present invention are as follows:
(a) 3,5-di-tert-butyl-4-hydroxyphenyl acrylate

(b) 3,5-di-tert-butyl-4-hydroxyphenyl methacrylate $$CH_2=C(CH_3)—COOR$$

(c) bis(3,5-di-tert-butyl-4-hydroxyphenyl) fumarate

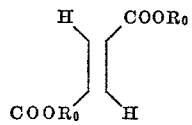

(d) bis(3,5-di-tert-butyl-4-hydroxyphenyl) itaconate

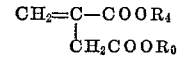

wherein $R_0$ is

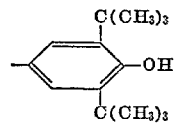

The above listed α,β-unsaturated esters were reacted with the following phosphinodithioic acids and O,O-diesters of phosphorothiolothionic acid:

(e) diphenylphosphinodithioic acid $$(CH_6H_5)_2P(S)SH$$

(f) O,O-diethyl hydrogen phosphorodithioate $$(C_2H_5O)_2P(S)SH$$

(or diethyldithiophosphate)

Table I below contains illustrative examples of the antioxidants of this invention with some of their properties. These antioxidants have been prepared by the addition of the diphenylphosphinodithioic acid and O,O-diethyl hydrogen phosphorodithioate to the α,β-unsaturated ester according to the general procedure described above.

TABLE I.—NOVEL ANTIOXIDANTS AND THEIR PROPERTIES

| Appearance | Melting or boiling point (° C.) crystallized from— | Starting materials | Product | |
|---|---|---|---|---|
| Slightly yellow viscous oil | Purified by Aluminum oxide chromatography. | (a) plus (e) | 3,5-di-t-butyl-4-hydroxyphenyl, 3-(diphenylphosphinothioylthio)propionate, R₀OCOCH₂CH₂S(S)P(C₆H₅)₂. | (A) |
| White powder | M.P., 117-119 cyclohexane | (c) plus (e) | Bis(3-5-di-t-butyl-4-hydroxyphenyl), 2-(diphenylphosphinothioylthio)succinate.  R₀OCOCHS(S)P(C₆H₅)₂  \|  R₀OCOCH₂ | (B) |
| Do | M.P., 54-56 heptane/cyclohexane | (d) plus (e) | Bis(3,5-di-t-butyl-4-hydroxyphenyl) 2-(diphenylphosphinothioylthiomethyl)succinate.  R₀OCOCHCH₂S(S)P(C₆H₅)₂  \|  R₀OCOCH₂ | (C) |
| Colorless, viscous oil | Purified by aluminum oxide chromatography. | (b) plus (f) | 3,5-di-t-butyl-4-hydroxyphenyl 2-methyl-3-(diethoxyphosphinothioylthio)propionate R₀OCOCH(CH₃)CH₂S(S)P(OC₂H₅)₂. | (D) |
| White crystals | M.P., 80-85 hexane | (c) plus (f) | Bis(3,5-di-t-butyl-4-hydroxyphenyl), 2-(diethoxyphosphinothioylthio)succinate.  R₀OCOCHS(S)P(OC₂H₅)₂  \|  R₀OCOCH₂ | (E) |
| Do | M.P., 57-61 | (d) plus (f) | Bis(3,5-di-t-butyl-4-hydroxyphenyl) 2-(diethoxyphosphinothioylthiomethyl)succinate.  R₀OCOCHCH₂S(S)P(OC₂H₅)₂  \|  R₀OCOCH₂ | (F) |

Additional examples of the novel antioxidants of this invention are listed in Table II. These antioxidants are prepared according to the procedure described supra. All phosphinodithioic acids and O,O-diesters of phosphorothiolothionic acid listed in Table II are prepared according to the procedure in Houben-Weyl, as mentioned above. The synthesis of all α,β-unsaturated esters containing hindered phenolic groups is described in my copending application Ser. No. 738,770, filed June 21, 1968, now abandoned.

One general method for preparing said unsaturated esters comprises reacting an alcohol dissolved in pyridine with an acid chloride. For example 2,6-di-t-butylhydroquinone and acrylyl chloride yield 3,5-di-t-butyl-4-hydroxyphenyl acrylate; 2,6-di-t-butylhydroquinone and methacrylyl chloride yield 3,5-di-t-butyl-4-hydroxyphenyl methacrylate; 2,6-di-t-butylhydroquinone and fumaryl chloride yield bis(3,5-t-butyl-4-hydroxyphenyl)fumarate; 2,6-di-t-butylhydroquinone and itaconyl chloride yield bis(3,5-di-t-butyl-4-hydroxyphenyl) itaconate.

TABLE II.—NOVEL ANTIOXIDANTS

| Phosphinodithioic acids and O,O-diesters of phosphorothiolothionic acids | α,β-Unsaturated esters [1] | Novel antioxidants | |
|---|---|---|---|
| $(C_2H_5)_2P(S)SH$ | (=CHCOOR₀)₂ (trans) | R₀OCOCHS(S)P(C₂H₅)₂  \|  R₀OCOCH₂ | (G) |
| $(C_4H_9)_2P(S)SH$ | (=CHCOOR₀)₂ (trans) | R₀OCOCHS(S)P(C₄H₉)₂  \|  R₀OCOCH₂ | (H) |
| $(C_6H_5CH_2)_2P(S)SH$ | CH₂=CHCOOR₀ | R₀OCOCH₂CH₂S(S)P(CH₂C₆H₅)₂ | (I) |
| $(p\text{-}CH_3C_6H_4)_2P(S)SH$ | CH₂=CHCOOR₀ | R₀OCOCH₂CH₂S(S)P(C₆H₄CH₃)₂ | (J) |
| $(p\text{-}ClC_6H_4)_2P(S)SH$ | CH₂=C—COOR₀  \|  CH₂COOR₀ | R₀OCOCH₂S(S)P(C₆H₄Cl)₂  \|  R₀OCOCH₂ | (K) |
| $(C_5H_{11}O)_2P(S)SH$ | (=CHCOOR₀)₂ (trans) | R₀OCOCHS(S)P(OC₅H₁₁)₂  \|  R₀OCOCH₂ | (L) |
| $(C_6H_5O)_2P(S)SH$ | (=CHCOOR₀)₂ (trans) | R₀OCOCHS(S)P(OC₆H₅)₂  \|  R₀OCOCH₂ | (M) |
| $(C_6H_5CH_2O)_2P(S)SH$ | CH₂=C(CH₃)COOR₀ | R₀OCOCH(CH₃)CH₂S(S)P(OCH₂C₆H₅)₂ | (N) |
| $(C_6H_5CH_2CH_2O)_2P(S)SH$ | CH₂=CHCOOR₀ | R₀OCOCH₂CH₂S(S)P(OCH₂CH₂C₆H₅)₂ | (O) |
| CH₂—O\\<br>      P(S)SH<br>CH₂—O/ | CH₂=C—COOR₀  \|  CH₂COOR₀ | R₀OCOCHCH₂S(S)P(O—CH₂ / O—CH₂)  \|  R₀OCOCH₂ | (P) |
| CH₃—CH—O\\<br>        P(S)SH<br>CH₃—CH—O/ | CH₂=C—COOR₀  \|  CH₂COOR₀ | R₀OCOCHCH₂S(S)P(O—CH—CH₃ / O—CH—CH₃)  \|  R₀OCOCH₂ | |

[1] $R_0 =$ 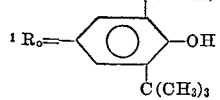 , 3,5-di-t-butyl-4-hydroxyphenyl.

C(CH₃)₃, 3,5-di-t-butyl-4-hydroxyphenyl.

After the precipitated hydrochloride is removed, the reaction liquid is evaporated yielding crude product which is purified either by distillation or recrystallization.

The oxidation of most polymers is so slow at ambient temperatures, even in the absence of antioxidants, that testing of the effects of antioxidants must necessarily be conducted at high temperatures in order to yield results within a convenient period of time. The tests conducted on the materials listed in the following tables were conducted either in a tubular oven with an airflow of 400 cubic feet per minute at an oven temperature of 150° C. or in a rotary oven with a 4 r.p.m. at an oven temperature of 150° C. The oven ageing is set out in hours.

In preparing the sample for testing, unstabilized polypropylene powder is thoroughly blended with the indicated antioxidant. The blended material is thereafter milled on a two-roller mill at a temperature of 182° C. for six minutes after which time the stabilized polypropylene is sheeted from the mill and allowed to cool. The milled polypropylene sheet which has been stabilized is then cut into small pieces and pressed for seven minutes on a hydraulic press at 218° C. and 174 p.s.i. pressure. The resultant sheet of 25 mil thickness is then tested for resistance to accelerated ageing in the above described tubular oven. In Tables III and IV are reported the results of the oven ageing tests in which the antioxidants of this invention were added to polypropylene together with the indicated ultraviolet light absorber and the synergist.

TABLE III.—EVALUATION OF ANTIOXIDANTS IN POLYPROPYLENE (25 MIL), ROTARY OVEN, 150° C.

| Product | Hours to fail at— | |
|---|---|---|
| | 0.25% antioxidant plus 0.5% U.V.-2 | 0.1% antioxidant plus 0.5% U.V.-2 plus 0.3% DSTDP |
| A | 235 | 470 |
| B | 530 | 980 |
| C | 610 | 1,130 |

Note.—UV-2=An ultraviolet absorber, 2(3′,5′-di-tert-butyl-2′-hydroxy-phenyl)-5-chlorobenzotriazole. DSTDP=distearylthiodipropionate, commercial synergist for antioxidants.

TABLE IV.—EVALUATION OF ANTIOXIDANTS IN POLYPROPYLENE (25 MIL), TUBULAR OVEN, 150° C.

| Product | Hours to fail at— | |
|---|---|---|
| | 0.25% antioxidant plus 0.5% U.V.-2 | 0.1% antioxidant plus 0.5% U.V.-2 plus 0.3% DSTDP |
| D | 20 | 20 |
| E | 320 | 380 |
| F | 270 | 270 |

See footnote bottom of Table III.

Results similar to those reported in Tables III and IV are obtained when the antioxidants of Table II are employed together with the indicated secondary antioxidants and ultraviolet absorbers.

| Product | Secondary antioxidant | U.V. absorber |
|---|---|---|
| G | DSTDP | 2-(3′-t-butyl-2′-hydroxy-5-methylphenyl)-5-chlorobenzotriazole. |
| H | DLTDP | 2-hydroxy-4-n-octyloxybenzophenone. |
| I | Tris-nonylphenylphosphite. | 4-dodecyloxy-2-hydroxybenzophenone. |
| J | Trilauryl trithiophosphite | 4-t-octylphenyl salicylate. |
| K | DLTDP | Phenylsalicylate. |
| L | DLTDP | 4-t-butylphenyl salicylate. |
| M | Tris-nonylphenylphosphite. | 2,4-dihydroxybenzophenone. |
| N | DSTDP | 2-hydroxy-4-methoxybenzophenone. |
| O | Trilauryl trithiophosphite | 5-chloro-2-hydroxybenzophenone. |
| P | DSTDP | 4-t-octylphenyl salicylate. |
| Q | DLTDP | 2-(2′-hydroxy-5′-methylphenyl) benzotriazole. |

Note.—DLTDP=Dilaurylthiodipropionate.

It should be noted that in all above examples of stabilizing compositions the use of a secondary antioxidant and an ultraviolet absorber is optional. However, for best results, said additives should be employed in conjunction with the antioxidants of this invention, especially the secondary antioxidant. These supplementary additives may be used in the amount of from about 0.05 to about 5% each, and preferably from about 0.1 to about 2% by weight of the substrate.

Besides activity in the oven ageing test, the novel antioxidants of the present invention are characterized by excellent color values (no discoloration during the oven ageing test) and good gas fading properties.

The present antioxidants are useful in protecting synthetic polymers such as polypropylene against oxidation in air, thermal degradation or deterioration by including in such substances, a stabilizing amount of the antioxidant which will vary between about 0.01 and 5% and preferably, from about 0.05 to about 1.0% by weight. The antioxidant can be incorporated into the synthetic polymers using conventional procedures. For example, the antioxidants of the present invention are incorporated into the material to be stabilized by any suitable means such as by milling the antioxidant on hot or cold mill rolls, by mixing it in by the use of a Banbury mixer or other well-known devices of this nature or the antioxidant may be mixed with a polyolefin material in the form of molding powder and incorporated during extrusion or prior to extrusion or during injection molding. The antioxidant may even be incorporated into a solution of the polyolefin material and the solution may then be employed for the formation of films, for wet or dry spinning of fibers, monofilament and the like.

The examples set out above are to be considered as illustrative of the present invention and are not to be considered as restrictive. It is therefore to be understood that the invention is not limited to the specific embodiments set out above except as defined in the appended claims.

What is claimed is:

1. A composition of matter stabilized against deterioration comprising an organic material normally subject to deterioration and a stabilizing amount of an antioxidant compound having the formula

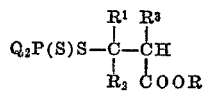

wherein —Q is —R⁴ or —OR⁴
—R is

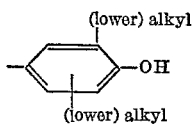

—R¹, R², R³ are each hydrogen, (lower)alkyl, phenyl, aralkyl or —$C_mH_{2m}COOR$, where $m$ is 0 to 6;
—R⁴ is alkyl, cycloalkyl, phenyl and aralkyl and when Q is —OR⁴ the two —R⁴ groups can be —$(CH_2)_n$—, where $n$ is 2 or 3, forming a cyclic O,Q-diester of phosphorothiolothionic acid.

2. A composition of claim 1 wherein R is 3,5-di-t-butyl-4-hydroxyphenyl.

3. A composition of matter according to claim 2 wherein said antioxidant is a compound having the formula:

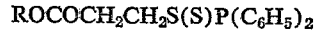

wherein R is a 3,5-di-t-butyl-4-hydroxyphenyl.

4. A composition of matter according to claim 2 wherein said antioxidant is a compound having the formula:

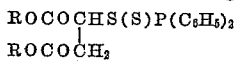

wherein R is 3,5-di-t-butyl-4-hydroxyphenyl.

5. A composition of matter according to claim 2 wherein said antioxidant is a compound having the formula:

ROCOCHCH₂S(S)P(C₆H₅)₂
|
ROCOCH₂ wherein R is 3,5-di-t-butyl-4-hydroxyphenyl.

6. A composition of matter according to claim 2 wherein said antioxidant is a compound having the formula:

ROCOCH(CH₃)CH₂S(S)P(OC₂H₅)₂ wherein R is 3,5-di-t-butyl-4-hydroxyphenyl.

7. A composition of matter according to claim 2 wherein said antioxidant is a compound having the formula:

ROCOCHS(S)P(OC₂H₅)₂
|
ROCOCH₂ wherein R is 3,5-di-t-butyl-4-hydroxyphenyl.

8. A composition of matter according to claim 2 wherein said antioxidant is a compound having the formula:

ROCOCHCH₂S(S)P(OC₂H₅)₂
|
ROCOCH₂ wherein R is 3,5-di-t-butyl-4-hydroxyphenyl.

References Cited

UNITED STATES PATENTS

| | | | |
|---|---|---|---|
| 2,876,156 | 3/1959 | Barley et al. | 290—942 |
| 2,578,652 | 12/1951 | Cassady | 260—942 |
| 3,047,459 | 7/1962 | Perini et al. | 260—941 |
| 3,367,870 | 2/1968 | Spivack | 260—45.95 |
| 3,291,809 | 12/1966 | Cyba | 260—45.8 |

DONALD E. CZAJA, Primary Examiner

V. P. HOKE, Assistant Examiner

U.S. Cl. X.R.

99—163; 106—177; 252—46.7, 49.9; 260—45, 85 S, 398.5, 814, 45.8 R